United States Patent [19]

Egner

[11] 4,274,460

[45] Jun. 23, 1981

[54] PANEL FASTENER JOINT

[75] Inventor: Ronald J. Egner, Birmingham, Mich.

[73] Assignee: Textron, Inc., Providence, R.I.

[21] Appl. No.: 50,157

[22] Filed: Jun. 20, 1979

[51] Int. Cl.³ ............................................. F16B 39/00
[52] U.S. Cl. ..................................... 411/83; 411/353;
411/424
[58] Field of Search .......................... 151/69, 41.75, 68;
85/8.8, 1 K, 9 R; 403/21, 406, 405

[56] References Cited

U.S. PATENT DOCUMENTS

| | | | |
|---|---|---|---|
| 939,001 | 11/1909 | Forster et al. | 85/1 K X |
| 1,209,460 | 12/1916 | Lowe | 151/69 |
| 1,491,394 | 4/1924 | Griffith et al. | 85/1 K X |
| 2,108,316 | 2/1938 | Love | 85/8.8 X |
| 2,456,355 | 12/1948 | Aber | 85/8.8 |
| 2,472,394 | 6/1949 | Barraket | 151/54 |
| 2,760,540 | 8/1956 | Poupitch | 151/41.75 |
| 3,079,188 | 2/1963 | Oswold | 85/8.8 X |
| 3,221,794 | 12/1965 | Acres | 151/69 |
| 3,347,293 | 10/1967 | Clark | 85/8.8 |
| 3,357,064 | 12/1967 | Munse | 151/41.75 X |
| 3,602,284 | 8/1971 | Smith et al. | 85/1 K X |
| 3,782,437 | 1/1974 | Seckerson | 151/41.75 X |
| 3,812,756 | 5/1975 | Wenger | 151/69 X |

FOREIGN PATENT DOCUMENTS

| | | | |
|---|---|---|---|
| 2715271 | 10/1977 | Fed. Rep. of Germany | 85/1 K |
| 588215 | 5/1947 | United Kingdom | 151/69 |

*Primary Examiner*—Ramon S. Britts
*Attorney, Agent, or Firm*—Trexler, Wolters, Bushnell & Fosse, Ltd.

[57] ABSTRACT

There is disclosed a structural joint comprising a workpiece in the form of a section of sheet material and a fastener assembly, wherein the components of said joint are constructed to retain the fastener assembly in mounted relation with respect to the sheet material and confine the fastener against rotation upon the attachment of an additional fastener component thereto. The section of sheet material includes an aperture having a multi-lobular periphery. The fastener assembly includes a head portion and a shank portion extending axially therefrom. The head portion has an end cap section which is of a greater dimension than the sheet material aperture, and an intermediate section extending axially from the cap section and having a multi-lobular peripheral dimension to be received in the multi-lobular aperture formed in the section of sheet material. The end cap section also includes a third section extending axially from the intermediate section to the shank portion, which third section has a circumferential groove formed therein with a resilient split retaining ring loosely mounted in said groove. The retaining ring is caused to be reduced in dimension from its free form dimension upon engaging the sheet aperture and to be returned to its free form dimension after the head portion intermediate section is received by the aperture. As a result, the fastener is retained within the aperture with the sheet material confined between the fastener end cap and the retaining ring while the multi-lobular aperture and intermediate section peripheries co-act to prevent rotation of the fastener.

15 Claims, 4 Drawing Figures

PANEL FASTENER JOINT

BACKGROUND OF THE INVENTION

The present invention is generally directed to panel fasteners and more particularly to a panel fastener joint, which joint includes a workpiece in the form of a section of sheet material and a fastener assembly; the workpiece and fastener assembly are constructed to confine the fastener assembly against axial and rotational movement thereby enabling ready use of the fastener assembly during subsequent assembly operations.

Panel fasteners for use in structural joints and connections are well-known in the art and are used extensively by the auto industry. For example, self-clinching fasteners are used in a number of applications wherein the fastener is assembled in a pre-punched hole in a section of sheet material, and then the head portion thereof is seated or embedded into the upper surface of the sheet material to cause displacement of a portion of the material radially inwardly of the aperture causing the material to co-flow into an annular locking groove formed in the fastener. The mechanical interlock thus created provides the means for maintaining the fastener in pre-assembled engagement with the sheet material so that subsequently a mating component can be attached thereto without the need for engaging the head portion with a tool or wrench. These fasteners, which are often referred to as "blind fasteners" are used for joints where ready access to one side of the workpiece is not available. An example of a self-clinching fastener of this type can be found in U.S. Pat. No. 3,967,669 which issued on July 6, 1976 and which is assigned to the assignee of the present invention. Another form of pre-assembled joint that is used is the type wherein the fastener assembly is disposed within a sheet material aperture and is welded thereto. Prior art joints of the type discussed have generally been found to be acceptable; however, they are costly and there has been a continuing need for reliable, less expensive assemblies.

The present invention provides a design wherein the fastener may be pre-assembled to a section of sheet material without regard for the thicknesses thereof. Also, as is well known, the structural integrity of a joint is, in large part, dependent upon the amount of material removed from the sheet material in forming the workpiece aperture. As more material is removed, the structural integrity of the resulting joint is diminished. With the present invention, the use of the multi-lobular aperture and cap end section serves to maintain a higher degree of integrity than achieved with prior designs. It is also necessary, when the fastener includes a threaded shank portion, to not only confine the fastener axially within the sheet material aperture, but to also prevent rotation upon subsequent assembly operations, wherein a mating threaded member is to be secured to the fastener.

It is therefore a general object of the present invention to provide a new and improved joint assembly.

It is a more particular object of the present invention to provide a joint assembly which includes workpiece sheet material and a fastener assembly which provides reliable fastener confinement within a sheet material aperture notwithstanding different sheet material thicknesses.

It is a further object of the present invention to provide such a joint assembly which exhibits improved structural integrity for the workpiece.

It is a still further object of the present invention to provide a fastener assembly for use in a joint including a workpiece in the form of a section of sheet material, and a fastener member having means for being confined within a sheet material aperture against axial and rotational movement and wherein the fastener is adapted to be engaged reliably with sheet material of different thicknesses.

The disclosed and hereinafter discussed embodiment of the present invention provides a fastener assembly for a joint with a workpiece of the type including a section of sheet material having an aperture (multi-lobular in the illustrated embodiment) having a center and defined by a periphery having a non-constant radial dimension from the center including a minimum radial dimension and a maximum radial dimension. The fastener assembly for the joint includes a fastener member having a head portion and a shank portion extending axially therefrom, the head portion including a first section having an outer peripheral dimension which is greater than the maximum dimension of the aperture, a second section extending axially from the first section towards the shank portion and having a non-constant peripheral radial dimension corresponding to the aperture dimension and receivable within said aperture, a third portion between the second section and the shank portion including a circumferential groove, and a resilient, contractable retaining ring carried within the circumferential groove. The shank portion and the head third section are dimensioned to pass through the aperture. The retaining ring has a free form dimension which enables it to be carried loosely within the circumferential groove, said free form dimension being such that the ring has a maximum dimension which is greater than the minimum dimension of said aperture, but less than the maximum dimension of said aperture. Said groove being of a depth such that the retaining ring may be contracted to an outer dimension less than the minimum dimension of the aperture, to permit said ring to be received through the aperture. After passing through the aperture, the ring may return to its free form dimension thereby retaining the fastener assembly in mounted relation with respect to the apertured section of sheet material. The corresponding peripheral dimensions of the aperture and the head second section co-act to prevent rotation of the fastener assembly within the aperture.

BRIEF DESCRIPTION OF THE DRAWINGS

The features of the present invention which are believed to be novel are set forth with particularity in the appended claims. The invention, together with further objects and advantages thereof, may best be understood with reference to the following description of the illustrated embodiment taken in conjunction with the accompanying drawings, and in the several figures of which like references numerals indicate identical elements and in which:

DESCRIPTION OF THE ILLUSTRATED EMBODIMENT

Figure 1:
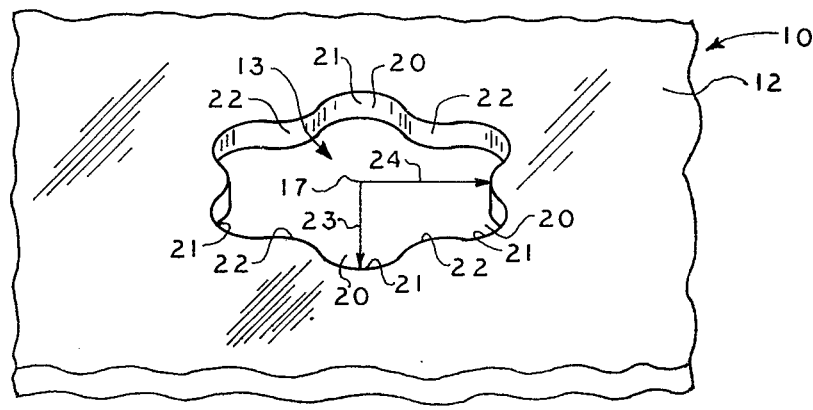
FIG. 1 is a partial, exploded, perspective view, to an enlarged scale, illustrating a joint embodying the present invention prior to assembly thereof.
Figure 1:
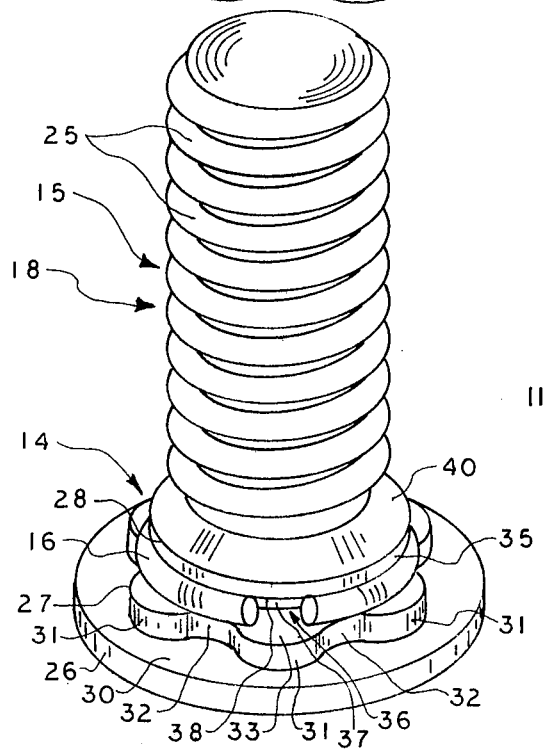

Referring now to FIG. 1, a joint embodying the present invention there illustrated in preassembled form includes a workpiece 10 and a fastener assembly designated generally 11. The workpiece 10 as shown for purposes of illustration includes a section of sheet material 12 having an aperture 13 formed therein, of a configuration to be discussed hereinafter. The fastener assembly 11 includes a fastener member 18 having a head portion 14, a shank portion 15 extending axially from the head portion 14, and a retaining ring 16 carried by said head portion.

The aperture 13 formed in the sheet material section 12 has a center 17 and is defined by a periphery having a non-constant radial dimension from the center 17. More specifically, the aperture 13 is defined by a periphery having a multi-lobular configuration of a type illustrated and disclosed in specific detail in U.S. Pat. No. 3,584,667, which disclosure is incorporated herein by reference. As can be seen from the figure, the multi-lobular configuration is defined by a periphery comprising a series of inwardly extending projections 20 defined by a first series of arcuately curved outwardly concaved surfaces 21, and a second series of surfaces 22, which are curved oppositely of said first series of surfaces, viz., surfaces 22 are inwardly convexed, and alternate and merge smoothly with said first series of surfaces 21. As a result, the aperture 13 has a non-constant radial dimension, with maximum radius 23 and a minimum radius 24. In other words, the aperture 13 is formed by a first series of outwardly arcuately curved surfaces 21 and a second series of inwardly arcuately curved surfaces 22 wherein the surfaces of the first and second series alternate and are smoothly merged. Hence, an aperture is formed which has a plurality of inwardly extending lobes or projections 22, which are spaced about the peripheral surface of said aperture, said projection being separated by the concave flutes provided by surfaces 21.

As previously mentioned, the shank portion 15 of the fastener assembly 11 extends axially from the head portion 14. The shank portion 15, in the illustrated embodiment, has an external thread 25 for engagement with an internally threaded fastener member (not shown) such as a nut, which might be used in mounting or connecting an element (also not shown) to the workpiece 10. Although a single threaded shank portion is illustrated, of course, the fastener assembly 11 may be of the double-ended type with another threaded shank portion extending from head portion 14, oppositely of the shank portion 15, or fastener means of a form other than the thread 25 may be employed.

The head portion 14 of the fastener assembly 11 includes a first or end cap section 26, a second or intermediate section 27, and a third section 28. The first or end cap 26 is of a greater diametrical dimension than the maximum dimension of the aperture 13 of sheet material 12 so that when the fastener assembly 11 is assembled to the workpiece 10, the surface 30 of the end cap 26 will engage the sheet material and preclude the fastener 11 from passing therethrough.

The second or intermediate section 27 of the head portion 14 extends axially from the end cap 26 toward the shank portion 15. The intermediate section 27 has a non-constant peripheral radial dimension and is configured to correspond to the peripheral dimension of the aperture 13 and sized to be disposed in said aperture. To that end, the intermediate section 27 comprises a first series of outwardly arcuately curved surfaces 31 and a second series of inwardly arcuately curved surfaces 32 wherein the curved surfaces of the first series alternate with the curved surfaces of the second series and are smoothly merged therewith. As a result, the surfaces 31 and 32 provide a series of alternating lobes and flutes, such that the peripheral dimensions of the intermediate section 27 defines a multi-lobular configuration similar to that of the aperture 13. The maximum and minimum dimensions of the intermediate section 27 are slightly less than the maximum and minimum dimensions of the aperture so that, when the joint is assembled, the intermediate section 27 is received within the aperture 13 with the respective lobes and flutes in mating engagement.

The third section 28 of head portion 14 extends axially from the upper surface 33 of the intermediate section 27 toward the shank portion 15. The third section 28 has a maximum diameter dimension defined by an annular cylindrical surface 35. In the cylindrical surface 35, adjacent the second section 27, there is provided a circumferential groove 36 defining an inner cylindrical bottom wall 37. The bottom wall 37 extends from the surface 33 of the intermediate section 27 to a radially disposed annular surface 38 with the surfaces 33 and 38 providing the side walls for said groove 36. On the side of cylindrical surface 35 opposite the circumferential groove 36, the third section 28 includes a tapered surface 40 which extends from the cylindrical surface 35 toward the shank portion 15. More particularly, the tapered surface 40 takes the form of a truncated cone portion extending between the cylindrical surface 35 and the shank portion 15, and its function will be described subsequently. The maximum diameter dimension of the third section 28 defined by the cylindrical surface 35 is smaller than the minimum dimension of the aperture 13, such that the third section 28 can pass easily through the aperture 13 as the joint is assembled.

Disposed in the circumferential groove 36 is a retaining ring 16, which is more or less loosely confined therein. More specifically, the inner diameter dimension of ring 16 is greater than the diameter of the bottom wall 37 of groove 36, but is of lesser dimension than the maximum diameter of the third section 28, as defined by the cylindrical surface 35. As can be seen from the drawing, the retaining ring 16 is in the form of a split ring, and the ring 16 is preferably formed from a resilient material such as metal. The cross-sectional shape of the ring 16 as illustrated and the dimensional relationship of said ring 16 with respect to the aperture 13 and the second section 27, are significant. It is believed, however, that these can best be understood after a discussion of the assembly of the joint, as will now be considered.

In the initial mounting of the fastener assembly 11 to the workpiece 10, the shank portion 15 is inserted into the aperture 13 and since said shank portion 15 is of lesser diameter it will pass freely through the aperture. After the shank portion 15 has fully passed through the aperture, the tapered surface 40 of the third section will guide the minimum peripheral dimensions of the aperture into engagement with the resilient, split retaining ring 16. Further insertion of the fastener assembly 11 will cause the resilient retaining ring 16 to be reduced or constricted in diameter dimension so that it also will pass through the aperture 13. It will be recalled that the resilient ring 16 is carried loosely in groove 36, and has an inner diameter greater than the bottom wall of said groove. As such, said groove 36 accommodates contraction of said ring. Since the groove 36 is immediately adjacent the multi-lobular intermediate portion 27, the ring 16 cannot pass through the aperture 13 until the respective lobes and flutes are aligned. When alignment is attained, movement can continue with the multi-lobular intermediate section 27 being received within the similar shaped aperture 13 in mating relation. After the retaining ring 16 has passed through the aperture, it will due to its resiliency, return to its free form dimension, which it will be noted is greater than the minimum dimension 24 of aperture 13. When this occurs, and due to the placement of the head or cap portion 26 adjacent the intermediate section 27, said multi-lobular intermediate section will be retained in mating relation with the aperture 13. That is to say, the sheet material 12 will be confined between the upper surface 30 of the cap or head section 26 and the retaining ring 16. Hence, the cap section and retaining ring confine the fastener assembly against axial movement relative to the workpiece, and the co-action between the respective multi-lobular peripheries on section 27 and aperture 13 will confine the fastener member against rotational movement relative to the sheet material 12.

As such, it can be appreciated from the above that there is provided a sub-assembly of the fastener member 18 with the workpiece 10, where the fastener member is retained in mounted relation, and is precluded from rotating with respect to said workpiece. Thus at some later point in the overall assembly operation in which the fastener combination 11 is being employed, an internally threaded member can easily be connected thereto. Most importantly this latter assembly step can be performed without the necessity of engaging the head or cap portion 26 with a holding tool or device. Accordingly, the fastener assembly 11 and the joint provided thereby are ideal for use in applications or situations where access to the fastener head portion 26 from one side of the workpiece 10 is not available or difficult, or if the tool clearance on said one side is limited. Obviously, if desired, the fastener 11 can be disassembled by merely constricting the ring 16 and pushing the fastener out of the aperture 13.

Figure 2:
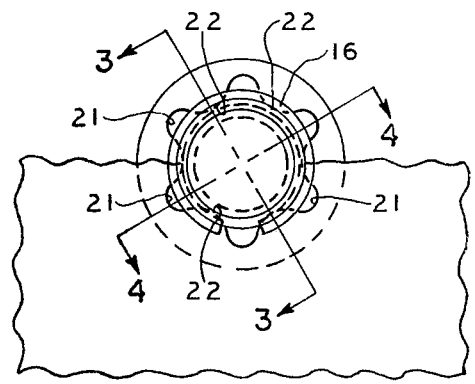
FIG. 2 is a partial, end view of the joint of FIG. 1 after the assembly thereof with a portion of the workpiece broken away.

Attention will now be directed to the dimensional feature of ring 16. More specifically, as shown in FIG. 2, the retaining ring 16 need only have an outer diameter which is greater than the minimum radius 24 of the aperture 13, as defined by the inwardly convex surfaces 22. It should be noted that, if a square or round aperture were used, the ring 16 would have to be of a larger size and, most importantly, more material would have to be removed from the workpiece 10 to form the aperture. The use of a larger ring does nothing more than increase the cost of the fastener assembly 11. The necessity for the large aperture would serve to weaken or reduce the structural integrity of the workpiece 10. With the present invention, and the employment of the multi-lobular aperture and intermediate section 27 with split ring 16, the aperture size requirement is reduced. It thus follows that the strength of the workpiece can be enhanced.

Figure 3:
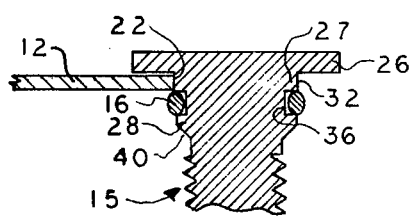
FIG. 3 is a cross-sectional view taken along lines 3—3 of FIG. 2.
Figure 4:
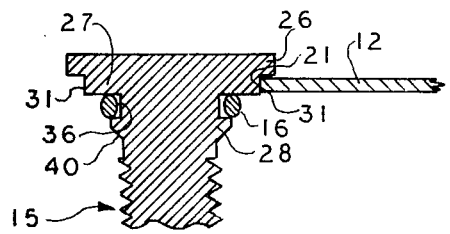
FIG. 4 is a cross-sectional view taken along lines 4—4 of FIG. 2.

As shown in FIGS. 3 and 4, the retaining ring 16 in the illustrated embodiment is preferably elliptical in cross-section. The elliptical form for retaining ring 16 is preferred in that it adapts the fastener assembly 11 for snap mounting to the workpiece 10. More specifically, upon assembly the elliptical form of ring 16 will facilitate the contraction of the ring upon engagement with the inwardly disposed projection or lobes 20 of the aperture 13. As such, the fastener 11 can be easily and quickly mounted to the workpiece by a simple manual insertion operation, without the need for special tools or the like to compress the ring 16. Also the elliptical shape adapts the assembly 11 for use with workpieces of varying thickness.

Not only does the joint of the present invention provide for reliable confinement of a fastener assembly within a work piece aperture, but the joint of the present invention also provides a joint assembly which exhibits improved structural integrity. The structural integrity of the joint is maximized because less material, than heretofore required, is removed from the workpiece sheet material. Specifically, the sheet material areas between the minimum and maximum radius dimensions of the aperture are preserved. Because the structural integrity of a joint is inversely related to the amount of material removed during the formation of the sheet material aperture, the joint of the present invention provides improved structural strength.

While a particular embodiment of the present invention has been shown and described, modifications may be made, and it is therefore intended to cover in the appended claims all such modifications and changes which fall within the true spirit and scope of the invention.

The invention is claimed as follows:

1. A joint comprising: a workpiece such as a section of sheet material, or the like, having a predetermined thickness and including an aperture formed therein, said aperture having a center and being defined by a periphery having a non-constant radial dimension from said center including a minimum radial dimension and a maximum radial dimension; and a fastener assembly mountable with said workpiece comprising a fastener member having a head portion and a shank portion extending axially therefrom, said head portion including a first enlarged head section having an outer peripheral dimension which is greater than that of said aperture, a second section extending axially from said first enlarged head section towards said shank portion and having a non-constant peripheral radial dimension corresponding in shape to said aperture dimension and receivable within said aperture, a third section intermediate said second section and said shank portion which includes a circumferential groove, said groove being spaced from said first enlarged head section by a distance only slightly greater than the thickness of said workpiece and a resilient retaining ring disposed within said circumferential groove, said shank portion and said head third section being dimensioned for passing through said aperture, said retaining ring having a free form dimension such that it is loosely carried within said circumferential groove, and with a maximum outer radial dimsneion greater than the minimum radial dimension of said aperture, and said groove having a depth which permits said ring to be contracted resiliently in a radial direction within said groove such that said ring may be received through said aperture, and due to the spacing of said groove from the enlarged head section said ring, upon returning to said free form dimension after passing through said aperture, will engage the surface of said workpiece opposite that engaged by said first enlarged head section, said ring cooperating with said first enlarged head section to retain said fastener assembly in mounted relation with respect to said apertured workpiece, thereby maintaining said head second section disposed within said aperture and the corresponding peripheral dimensions of said aperture and said head second section co-acting to prevent rotation of said fastener assembly within said aperture.

2. A joint as defined in claim 1 wherein said aperture periphery and said second section periphery are multi-lobular.

3. A joint as defined in claim 2 wherein said multi-lobular peripheries of said aperture and said second section comprise a series of projections defined by a first series of arcuately curved surfaces and a second series of surfaces curved oppositely of said first series and alternating therewith while merging smoothly with said first series, said projections serving, upon said second section being received within said aperture, to prevent relative rotation of said fastener assembly with respect to said sheet material.

4. A joint comprising: a workpiece such as a section of sheet material, or the like, and including an aperture formed therein, said aperture having a center and being defined by a periphery having a non-constant radial dimension from said center including a minimum radial dimension and a maximum radial dimension; and a fastener assembly mountable with said workpiece comprising a fastener member having a head portion and a shank portion extending axially therefrom, said head portion including a first section having an outer peripheral dimension which is greater than that of said aperture, a second section extending axially from said first section towards said shank portion and having a non-constant peripheral radial dimension corresponding to said aperture dimension and receivable within said aperture, a third section intermediate said second section and said shank portion which includes a circumferential groove, and a resilient retaining ring disposed within said circumferential groove, said shank portion and said head third section being dimensioned for passing through said aperture, said retaining ring having a free form dimension such that it is loosely carried within said circumferential groove, and with a maximum outer radial dimension greater than the minimum radial dimension of said aperture, and said groove having a depth which permits said ring to be contracted resiliently in a radial direction within said groove such that said ring may be received through said aperture, and upon returning to said free form dimension after passing through said aperture said ring and said first head section will retain said fastener assembly in mounted relation with respect to said apertured workpiece with said head second section being disposed within said aperture and the corresponding peripheral dimensions of said aperture and said head second section co-acting to prevent rotation of said fastener assembly within said aperture, said aperture periphery and said second section periphery being multi-lobular, and said resilient ring in its free form state overlaps only the projections defining said multi-lobular aperture periphery, such that the area of said aperture is minimized which serves to preserve the structural integrity of said workpiece.

5. A joint as defined in claim 1 wherein said retaining ring overlaps said sheet material between said minimum radius and said maximum radius of said aperture for retaining said fastener assembly within said aperture.

6. A joint as defined in claim 1 wherein said retaining ring comprises a split ring.

7. A joint as defined in claim 6 wherein said split ring is elliptical in cross-section.

8. A joint as defined in claim 1 wherein said head portion third section also includes an annular tapered guide surface for guiding said retaining ring into contact with said aperture minimum radial dimension.

9. A joint as defined in claim 8 wherein said shank portion includes an elongated externally threaded section of lesser dimension than said head portion third section.

10. A fastener assembly for use in a joint with a workpiece of the type which comprises a section of sheet material or the like having an aperture formed therein with a multi-lobular peripheral configuration, said fastener assembly comprising: a fastener member having a head portion, a shank portion extending axially from said head portion, and a resilient retaining ring carried by said fastener member, said head portion including a first section greater in dimension than said multi-lobular aperture, a second section extending axially from said first section and having a multi-lobular outer peripheral dimension corresponding to and adapted to be received in said multi-lobular apertured configuration, and a third section extending axially from said second section toward said shank portion and including a circumferential groove; said resilient retaining ring being mounted in said circumferential groove and having a free form dimension such that the outer diameter thereof is greater than the minimum internal dimension of said aperture, and the depth of said groove being such that said ring may be constricted to reduce its outer diameter from its free state to a diameter less than the minimum internal dimension of said multi-lobular aperture, such that said third section and said ring may pass through said aperture, and upon being allowed to return to its free form diameter dimension said ring and said first section of the head portion are adapted to maintain said fastener assembly in mounted relation with said workpiece, with said multi-lobular second section received in said multi-lobular aperture which co-acts to restrict rotational movement of said fastener assembly relative to said workpiece, said aperture and multi-lobular second section dimensions comprising complimentary outwardly curved surfaces alternating with and smoothly joined with inwardly curved surfaces, to provide alternating, mating flutes and lobes and wherein said retaining ring overlaps only said aperture lobes as defined by the inwardly curved surfaces thereof, such that the area of the material removed to form said aperture is minimized thus serving to preserve the structural integrity of the workpiece to which said fastener assembly is to be engaged.

11. A fastener assembly as defined in claim 10 wherein said third section further includes an annular tapered surface converging in the axial direction toward said shank portion for guiding said retaining ring into engagement with said multi-lobular aperture.

12. A fastener assembly as defined in claim 11 wherein said retaining ring comprises a split ring.

13. A fastener assembly as defined in claim 12 wherein said shank portion comprises an elongated externally threaded extension of lesser diameter dimension than said third section.

14. A fastener assembly as defined in claim 12 wherein said split ring is elliptical in cross-section.

15. A fastener assembly for use in a joint with a workpiece of the type which comprises a section of sheet material or the like having an aperture formed therein with a multi-lobular peripheral configuration, said fastener assembly comprising: a fastener member having a head portion, a shank portion extending axially from said head portion, and a resilient retaining ring carried by said fastener member, said head portion including a first section greater in dimension than said multi-lobular aperture, a second section extending axially from said first section and having a multi-lobular outer peripheral dimension corresponding to and adapted to be received in said multi-lobular apertured configuration, and a third section extending axially from said second section toward said shank portion and including a circumferential groove; said resilient retaining ring being mounted in said circumferential groove and having a free form dimension such that the outer diameter thereof is greater than the minimum internal dimension of said aperture, and the depth of said groove being such that said ring may be constricted to reduce its outer diameter from its free state to a diameter less than the minimum internal dimension of said multi-lobular aperture, such that said third section and said ring may pass through said aperture, and upon being allowed to return to its free form diameter dimension said ring and said first section of the head portion are adapted to maintain said fastener assembly in mounted relation with said workpiece, with said multi-lobular second section received in said multi-lobular aperture which co-acts to restrict rotational movement of said fastener assembly relative to said workpiece, said retaining ring having a free form outer dimension which is less than maximum dimension of said multi-lobular aperture but greater than the minimum dimension of said multi-lobular aperture.

* * * * *